United States Patent
Roper

[15] 3,670,594
[45] June 20, 1972

[54] INFINITELY VARIABLE PLANETARY TRANSMISSION

[72] Inventor: Daniel W. Roper, Rochester, Mich.
[73] Assignee: North American Rockwell Corporation, Pittsburgh, Pa.
[22] Filed: Jan. 26, 1970
[21] Appl. No.: 5,846

[52] U.S. Cl. .......................................... 74/689, 74/230.17 A
[51] Int. Cl. .................................... F16h 37/00, F16h 9/18
[58] Field of Search .......... 74/689, 230.17 A, 230.24, 242.8, 74/230.17 R; 192/11

[56] References Cited

UNITED STATES PATENTS

| | | | |
|---|---|---|---|
| 1,727,232 | 9/1929 | Farrell | 74/689 |
| 2,179,933 | 11/1939 | Heyer | 74/689 |
| 2,330,397 | 9/1943 | Trofimov | 74/689 |
| 2,377,013 | 5/1945 | Johnson | 74/689 |
| 2,932,216 | 4/1960 | Schou | 74/689 |
| 3,128,636 | 4/1964 | Graybill | 74/689 X |

FOREIGN PATENTS OR APPLICATIONS

| | | | |
|---|---|---|---|
| 238,409 | 2/1961 | Australia | 74/689 |
| 68,079 | 10/1957 | France | 74/689 |
| 844,901 | 8/1960 | Great Britain | 74/801 |

*Primary Examiner*—Carlton R. Croyle
*Assistant Examiner*—Thomas C. Perry
*Attorney*—John R. Bronough, Floyd S. Levison, E. Dennis O'Connor and Richard A. Speer

[57] ABSTRACT

An infinitely variable forward and reverse drive mechanical transmission has parallel input and output shafts, a pair of variable diameter drive pulleys fixed on the input shaft, a pair of driven pulleys rotatable upon the output shaft, belts interconnecting one pulley of each pair with an associated pulley of the other pair, planetary gearing comprising a pair of ring gears nonrotatably connected to the respective driven pulleys, a rotatable carrier mounting planet gears meshed with one of the ring gears, a fixed carrier mounting idler gears meshed with the other ring gear and a common sun gear, and a single control lever is provided for inversely varying the effective diameters of the drive pulley.

7 Claims, 8 Drawing Figures

PATENTED JUN 20 1972　3,670,594
SHEET 1 OF 4

INVENTOR
DANIEL W. ROPER

BY Strauch, Nolan, Neale, Nies + Kurz
ATTORNEYS

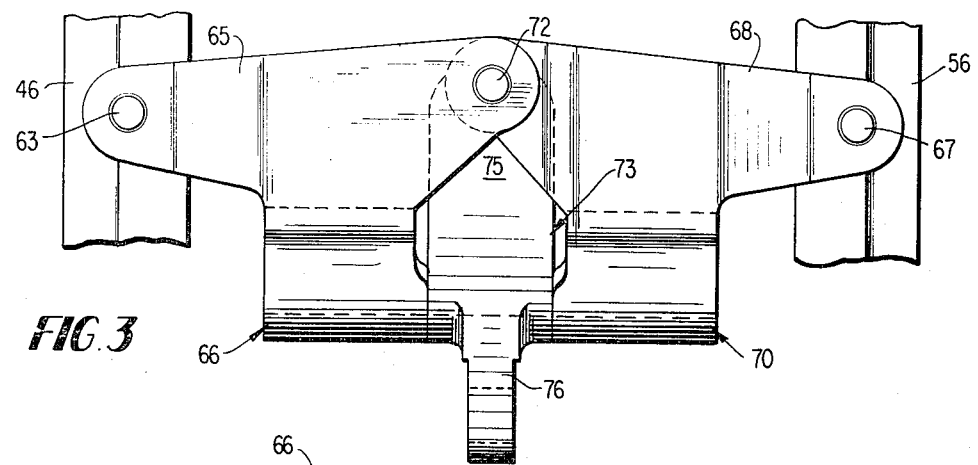
FIG. 3
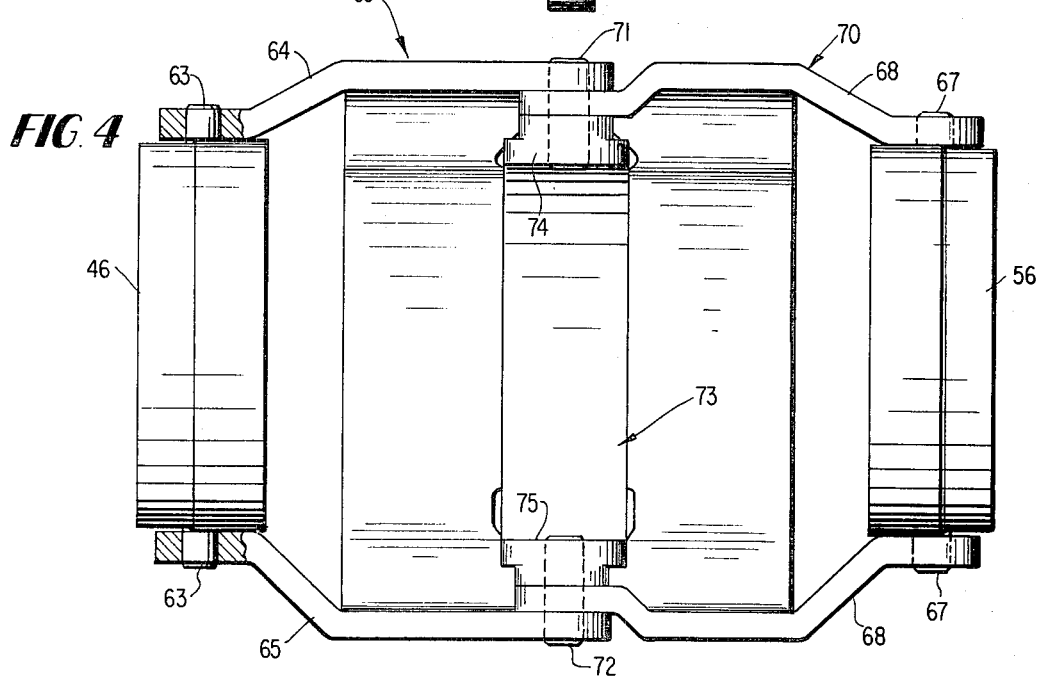
FIG. 4
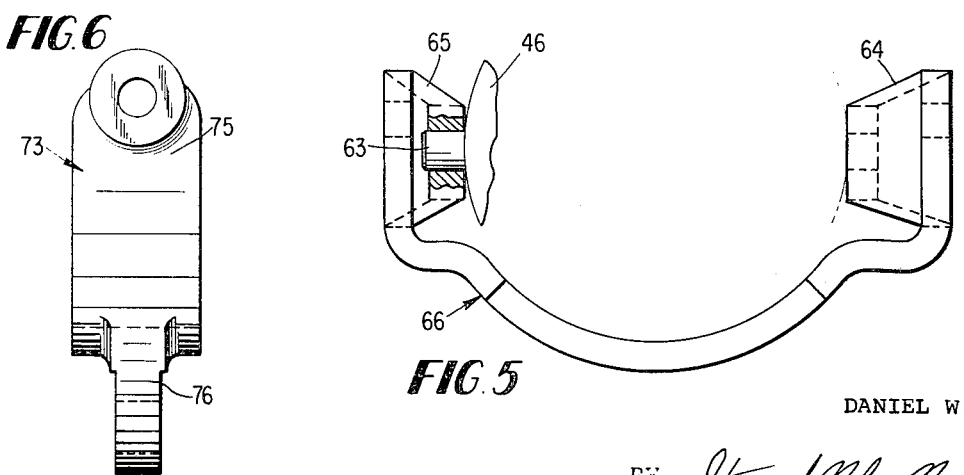
FIG. 6
FIG. 5
INVENTOR
DANIEL W. ROPER
BY Strauch, Nolan, Neale, Nies & Kurz
ATTORNEYS

PATENTED JUN 20 1972 3,670,594

INVENTOR

DANIEL W. ROPER

BY *Strauch, Nolan, Neale, Nies & Kurz*
ATTORNEYS

INFINITELY VARIABLE PLANETARY TRANSMISSION

INFINITELY VARIABLE MECHANICAL TRANSMISSION

This invention relates to a relatively simple, inexpensive and reliable mechanical power transmission assembly wherein infinitely variable drive ratios are obtainable in forward or reverse.

Hydrostatic drives are available that provide infinitely variable drive ratios and they provide a flexibility of performance and ease of control that make them preferable from many standpoints to mechanical transmissions.

However, hydrostatic drives are in general more expensive, particularly in their controls, and they usually require more expert maintenance than mechanical transmissions. This often is a deterrent to their use in power fields wherein the drive is employed in various types of materials handling equipment, small lift trucks, tow trucks, personel transports, agricultural equipment, golf carts, garden tractors, small recreation and invalid operated vehicles and the like, where low expense coupled with reliability of performance is desirable.

Mechanical transmissions employing belt driven and planetary gearing arranged for providing infinitely variable forward and reverse speeds have been proposed, as disclosed for example in the patents to Southwick U.S. Pat. No. 2,760,386; Mayfield et al U.S. Pat No. 3,091,132 and Browning U.S. Pat. No. 3,375,733.

The present invention accomplished a special solution of the problem by providing a novel mechanical transmission wherein the ring gear of a planetary gear set is driven through a variable ratio pulley drive, the carrier is connected to an output shaft, and the sun gear is reversely driven through another variable ratio pulley drive, with the speeds of the pulley drives being synchronously variable in inverse ratio, and preferably being regulated by a single control lever, and this is a major object of the invention.

Another object of the invention is to provide a novel mechanical transmission assembly wherein tandem variable inverse ratio pulley drives are connected to an output shaft through special planetary gearing having a dual input from the respective drives and a single output.

A further object of the invention is to provide a infinitely variable novel mechanical transmission wherein two inverse ratio pulley drives are connected to drive the ring gears of a main planetary gear set and a reverse gear set having a common sun gear that is reversely rotated with respect to the ring gear of the main set.

Further and more detailed objects of the invention will appear as the description proceeds in connection with the appended claims and the annexed drawings.

BRIEF DESCRIPTION OF DRAWINGS

FIG. 3 is an elevational view with certain parts omitted for clarity, showing the control mechanism;

FIG. 4 is a top plan view of the mechanism of FIG. 3;

FIG. 5 is an elevation partly broken away and in section showing mainly the shape of a toggle link;

FIG. 6 is an end elevation of the control yoke apart from the rest of the control mechanism;

PREFERRED EMBODIMENTS

Figure 1:
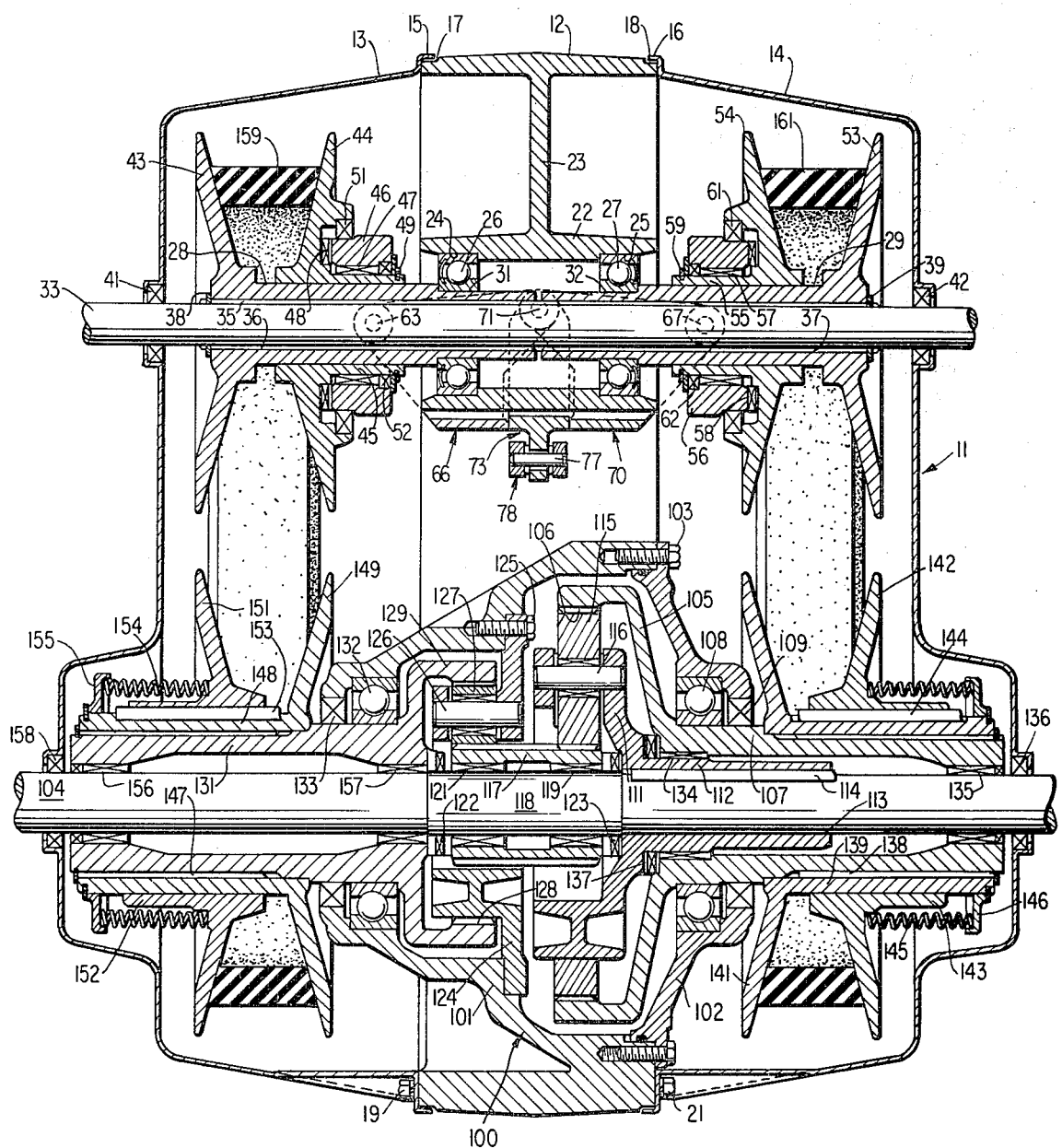
FIG. 1 is a sectional view illustrating a transmission assembly having planetary gearing, variable speed input pulley drives and control mechanism according to a preferred embodiment.

Referring to FIG. 1, the transmission assembly 11 is suitably supported on a vehicle frame. The transmission housing comprises a central relatively rigid cast metal housing member 12 that is open at opposite ends, and end members 13 and 14 that close opposite ends of the assembly and are fixedly mounted on the center member as by stepped annular inner end flanges 15 and 16 fitting upon recessed shoulders 17 and 18 respectively of the center member. In practice the center member is relatively sturdy since it carries the major weight of the assembly, and the end members may be of stamped sheet metal. As shown at the bottom of FIG. 1 the end members may be removably secured on the central member as by annular series of bolts 19 and 21 respectively. The end members are thus readily removable for access to the planetary gearing, belt drives and control mechanism as will appear.

Central housing member 12 has an internal hollow boss 22 on the inner end of an internally extending central web 23. Preferably the web and boss are integral parts of the housing.

Boss 22 is formed at opposite ends with recessed internal shoulders 24 and 25 mounting the outer recess of annular ball bearing units 26 and 27. Two hollow pulley shafts 28 and 29 which are substantially identical in structure have their inner ends extending into the opposite open ends of boss 22 where they are formed with reduced shouldered sections 31 and 32 respectively on which are fixed the inner races of bearings 26 and 27. As shown, shafts 28 and 29 are adjacent but not in contact within boss 22. Shafts 28 and 29 are normally installed by inserting them into opposite ends of the boss, and the boss and shaft shoulders coact with the bearing races to determine the longitudinal displacement of the shafts toward each other.

An input shaft 33 extends entirely through the transmission housing, and it has a longitudinal splined section 35 upon which both pulley shafts 28 and 29 are non-rotatably mounted, their longitudinally splined bores 36 and 37 fitting slidably with the splined shaft section. Snap rings 38 and 39 axially fixed in suitable input shaft grooves at the ends of the splined shaft section limit outward displacement of the pulley shafts.

Shaft 33 passes through a suitable oil seal 41 in housing end member 13 and a similar oil seal 42 in housing end member 14.

The composite shaft assembly consisting of input shaft 33 and pulley shafts 28 and 29 is therefore rotatable as a unit and it is supported on the transmission housing by bearings 26 and 27. Shaft 33 is operatively connected to a suitable source of power (not shown) outside the housing 11, and shaft 33 may be suitably supported by bearings and structures (not shown) limiting longitudinal displacement outside the housing.

Pulley shaft 28 is integral with one side 43 of a V-pulley. The other side 44 of the pulley has a hub 45 longitudinally slidably mounted on shaft 28. A thrust ring 46 is rotatably mounted on hub 45 by a bearing 47, and axial displacement of ring 46 is limited by an annular thrust bearing 48 on the pulley at one end and an axially fixed snap ring and washer assembly 49 on hub 45 at the other end. An oil seal 51 is provided between the thrust ring and the pulley side and an oil seal 52 is provided between the thrust ring and pulley hub 45 outwardly of bearing 47.

Pulley shaft 29 is integral with one side 53 of a second V-pulley. The other side 54 of the pulley has a hub 55 longitudinally slidably mounted on shaft 29. A thrust ring 56 is rotatably mounted on hub 55 by a bearing 57, and axial displacement of ring 56 is limited by an annular thrust bearing 58 on the pulley at one end and an axially fixed snap ring and washer assembly 59 on hub 55, at the other end. An oil seal 61 is provided between the thrust ring and the pulley side and an oil seal 62 is provided between the thrust ring and pulley hub 55 outwardly of bearing 57.

Thrust ring 46 is provided with diametrically opposite posts 63 (FIG. 4) on which are pivoted the spaced arms 64, 65 of a toggle link 66. Thrust ring 56 is provided with diametrically opposite posts 67 on which are pivoted the spaced arms of a toggle link 70. At their inner ends toggle links 66 and 70 are pivotally connected upon coaxial pivot posts 71 and 72.

A control yoke 73 has its opposite arms 74 and 75 pivoted on posts 71 and 72 respectively whereby the yoke and both toggle links are pivotally interconnected at a common axis.

An integral lug 76 on the control yoke is pivotally connected by pin 77 (FIG. 1) to one end of a control arm 78. The other end of control arm 78 (FIG. 7) extends through a housing opening 79 and has a longitudinally splined bore 81 by which it is non-rotatably secured upon the reduced diameter splined section 82 of a rail 83.

Rail 83 is rotatably and longitudinally slidably supported at one end in an internal housing bore 84, and its other end extends freely through a bore 85 in a fulcrum support member 86 that is rotatably mounted in an external housing bore 87 coaxial with bore 84. Arm 78 is axially fixed on rail 83, and rotatable support member 86 is formed with a lug 88 mounting a fulcrum 89 on which is pivoted a manual control lever 91. The inner end of lever 91 is pivotally connected at 92 to the adjacent end of rail 83.

Figure 7:
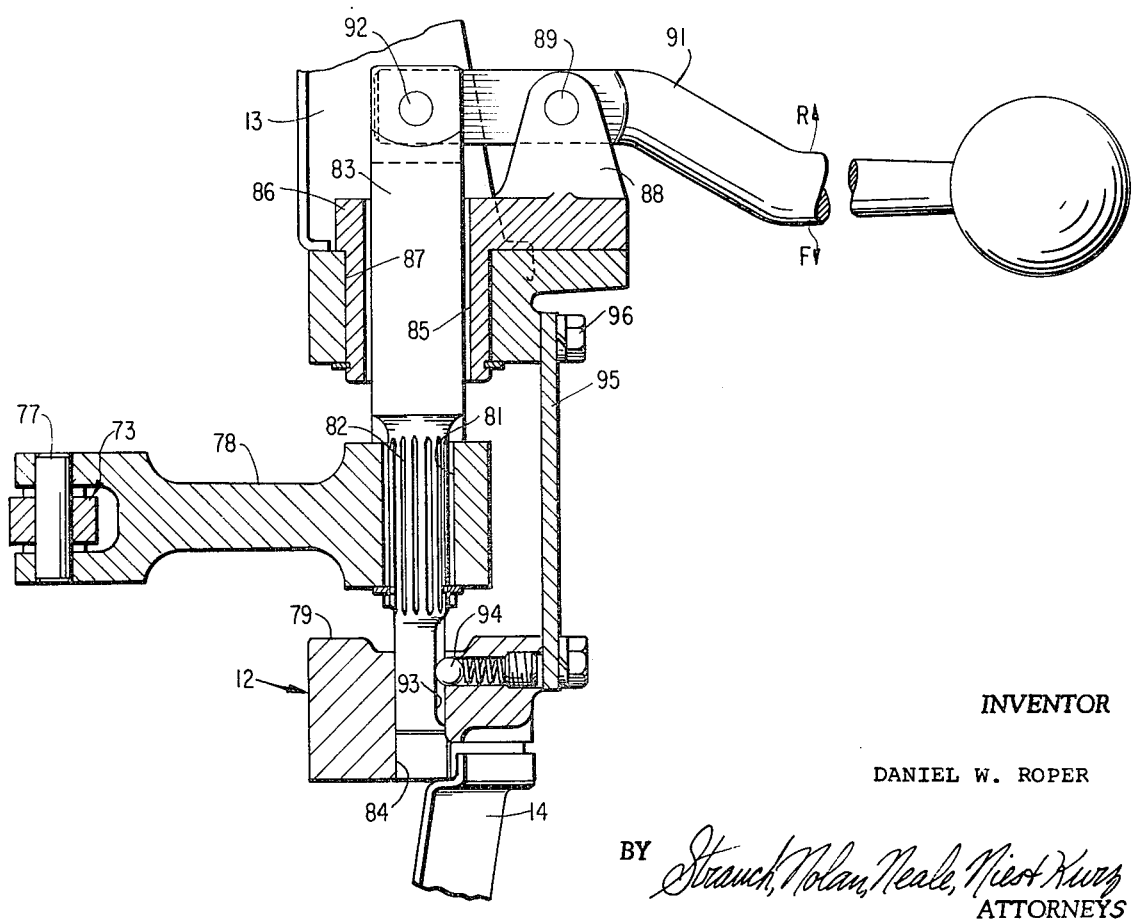
FIG. 7 is a fragmentary view partly broken away and in section showing the manual lever for the control mechanism.

Housing opening 79 is normally closed by a cover 95 secured by bolt 96, as shown in FIG. 7.

Thus, lever 91 may be operated in directions in the plane of FIG. 7 to rock about its fulcrum 89 whereby rail 83 is longitudinally displaced; and lever 91 may be operated in directions at right angles to the first direction to rock rail 83 about its axis. The inner end of rail 83 has a longitudinal groove 93 for receiving a spring biased holding ball detent 94 in one rotated position of the rail and this groove is long enough to accept the detent in any operative longitudinal position of the rail. The purpose of the foregoing structure will be explained later.

Referring again to FIG. 1, a planetary gear enclosing casing 100 is rigidly mounted in the lower part of housing 12. Casing 100 comprises a body portion 101 that may be integrally cast with housing member 12 and a side portion 102 secured to the body as by bolts 103.

An output shaft 104, parallel to input shaft 33, extends through the housing 12 and casing 100.

A ring gear 105 having internal teeth 106 is formed with a hollow hub 107 projecting out through one end of casing 100 and a ball bearing annulus 108 having its outer race fixed upon hub 107 supports ring gear 105 for rotation about the axis of shaft 104. An oil seal 109 extends between hub 107 and the casing side 102.

Figure 8:
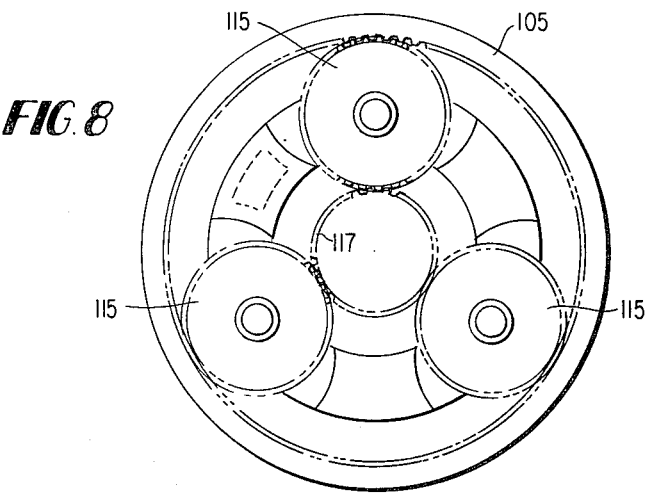
FIG. 8 is an end view diagrammatically showing a gearing detail.

A planetary gear carrier 111 has a hub 112 extending within ring gear hub 107 and formed with a bore 113 surrounding shaft 104. A key 114 extending between surface recesses in bore 113 and shaft 104 fixes carrier 111 non-rotatably upon output shaft 104. A plurality of planet gears 115, preferably three as shown in FIG. 8, are mounted on carrier 111 for free rotation about shaft 116. All of the planet gears 115 are meshed with ring gear 105.

Planet gears 115 are also meshed with sun gear 117 that is rotatably mounted on an intermediate large diameter section 118 of shaft 104, as by bearings 119 and 121. Displacement of sun gear 117 longitudinally of shaft 104 is resisted by thrust bearing assemblies 122 and 123 as will appear.

An internal casing wall 124 secured to the casing body as by bolts 125 provides a stationary carrier mounting a plurality of circumferentially equidistant shafts 126 rotatably mounting three idler gears 127. Idler gears 127 are constantly meshed with sun gear 117 and also with teeth 128 of an internal ring gear 129 that has a hub 131 projecting out through the opposite side of the casing from the hub of ring gear 105. A ball bearing annulus 132 has its inner race fixed on hub 131 and its outer race fixed on casing 100, whereby ring gear 129 is rotatably mounted in the casing coaxially with ring gear 105. An oil seal 133 extends between hub 131 and the casing.

Ring gear 105 is rotatably supported upon output shaft 104 by means of a bearing annulus 134 between the bore of hub 107 and the carrier hub 112, and a spaced bearing annulus 135 between the bore of hub 107 and shaft 104. An oil seal 136 extends between shaft 104 and housing side 14 where shaft 104 projects from that side of the transmission housing. A thrust bearing 137 is interposed between carrier 111 and the relatively rotatably ring gear 105.

The planetary gear set comprising ring gear 105, planet gears 115 and sun gear 117 are the main drive set in the assembly and the gear set comprising ring 129, idler gears 127 and the common sun gear 117 constitute the reverse drive set in the assembly.

Outside casing 100, but within the transmission housing, ring gear hub 107 is externally formed with longitudinal splines 138 non-rotatably mounting the splined hub 139 of a fixed V-pulley side 141 that is also secured against axial displacement. The other side 142 of the pulley has an internally splined or keyed hub 143 by which it is longitudinally slidably mounted on external splines or key 144 on hub 139. A series of compression springs 145 reacting against an annular stop 146 fixed on pulley hub 139 bias pulley side 142 toward pulley side 141.

Outside the other side of casing 100 and within the transmission housing, ring gear hub 131 is externally formed with longitudinal splines 147 non-rotatably mounting the splined hub 148 of a fixed V-pulley side 149 that is secured against axial displacement. The other pulley side 151 has an internally splined or keyed hub 152 by which it is longitudinally slidably mounted on external spines or key 153 on hub 148. A series of compression springs 154 reacting against an annular stop 155 fixed on pulley hub 148 bias pulley side 151 toward pulley side 149.

Spaced bearing annuli 156 and 157 are provided between ring gear hub 131 and output shaft 104, and an oil seal 158 extends between shaft 104 and housing end member 13 where the shaft projects from the transmission housing.

A V-belt 159 connects pulley 43,44 on the input shaft with pulley 149, 151 at the output shaft. A second V-belt 161 connects pulley 53,54 on the input shaft with pulley 141, 142 at the output shaft. In practice the elements of pulleys 43,44 and 53,54 are of the same size, and the elements of pulleys 149,151 and 141,142 are of the same size; but the relative effective pulley diameters may be varied in operation by a single lever movement of as will appear from the subsequent description of operation.

OPERATION

Input shaft 33 is preferably always driven in the same direction by a suitable source of power (not shown).

Both variable diameter pulleys 43, 44 and 53, 54 are drive connected to the input shaft, so that both of those pulleys are driven in the same direction. Referring to FIG. 1, it will be seen that pulley 53, 54 is connected by belt 161 and variable diameter pulley 141, 142 to directly drive main drive input ring gear 105. The carrier 111 of the main drive planetary gear set is the common output for both main and reverse drive gear sets and it is fixed to output shaft 104.

Referring to FIGS. 1 and 3–7, when lever 91 is rocked clockwise, in the direction of arrow F in FIG. 7, rail 83 is shifted to displace arm 78 to the right in FIGS. 1 and 3. This motion is transmitted through link 70 to displace collar 56 and therefore pulley side 54 to the right in FIG. 1 toward maximum effective pulley diameter representing maximum forward speed drive. Variable diameter pulley 141, 142 automatically changes diameter in accord with the change in diameter of pulley 53,54.

At the same time that pulley 53, 54 is being adjusted toward maximum diameter by clockwise rocking of lever 91, collar 46 and pulley side 44 are shifted to the right in FIG. 1 to vary the effective diameter of pulley 43, 44 toward minimum diameter and therefore minimum drive speed input to variable diameter pulley 149, 151 and ring gear 129 of the reverse gear set. Pulley 149, 151 automatically varies in diameter in accord with the adjusted diameter of pulley 43, 44.

Thus the drive ratio imparted toward the output shaft by the respective main planetary gear set and reverse gear set varies inversely as the drive ratio of the other.

When lever 91 has been shifted to provide maximum diameter for pulley 53,54 in the direction F in FIG. 7, maximum forward drive speed will be imparted to output shaft 104. During this time carrier 111 and planets 115 will be rolling around sun gear 117. Also during this time reverse ring gear 129 will be driven at minimum speed and since carrier 124 is fixed this will impart reverse rotation to sun gear 117, that is reverse to the rotation of main drive ring gear 105, but this does not affect the forward drive speed.

When lever 91 has been shifted in the direction of arrow R to provide maximum diameter of pulley 43, 44 (and therefore minimum diameter of pulley 53, 54) maximum reverse drive speed is imparted to output shaft 104. At this time the sun gear is driven at such a speed relative to ring gear 105 that it causes rotation of carrier 111 reversely with respect to the main drive ring gear which continues to rotate in the same direction but at minimum speed.

In the assembly the ring gears 105 and 129 always rotate in the same direction, and sun gear 117 always rotates in the reverse direction at a speed which is determined by the drive ratio imparted to it by pulley 43, 44, belt 159, pulley 149, 151 and the reverse gear set. The speed and direction of rotation of carrier 111 of the main planetary gear set is a function of the relative speeds of the sun gear 117 and main ring gear 105 which always rotate in opposite directions.

The speed of output shaft 104, for any speed of input shaft 33, may therefore be infinitely varied between maximum forward and maximum reverse. The speed passes through a zero output transition point, between forward and reverse or vice versa, when the ratio of the sun gear speed to the speed of main ring gear 105 is numerically equal to speed ratio of the main drive planetary set.

Figure 2:
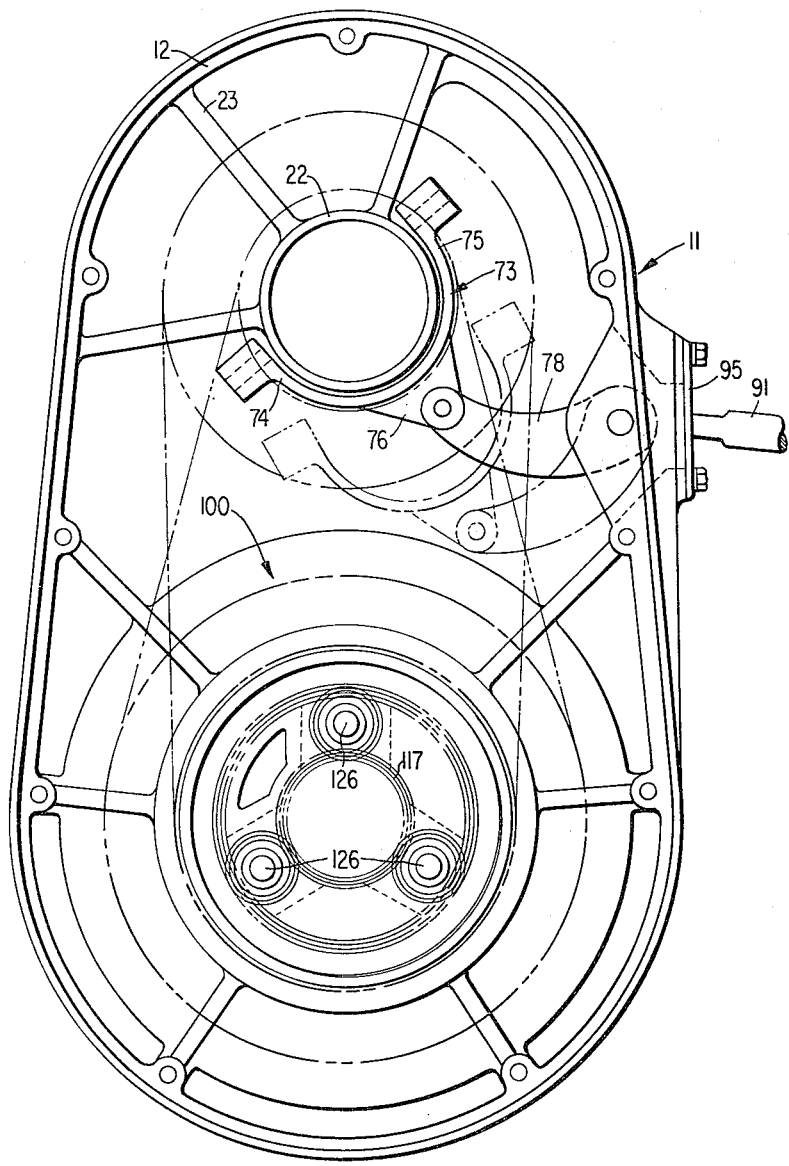
FIG. 2 is an end view looking into the transmission assembly of FIG. 1, with the pulleys and some of the planetary gearing removed.

When it is desired to shift the foregoing transmission into neutral, the lever 91 in any drive position is turned to rock rail 83 and its support 86 about the axis of rail 83 until detent 94 enters retaining recess 93 as shown in FIG. 7. Rocking of rail 83 in this fashion causes arm 78 to effect a downward pull on yoke 73 in FIG. 1 to collapse toggle links 66 and 70, and this displaces yoke 73 from the full line position of FIG. 2, which it occupies when power is being transmitted, to the chain line position shown in FIG. 2 wherein it acts through both toggle links 66 and 70 to shift the movable pulley sides 44 and 54 toward each other sufficiently that belts 159 and 161 become slack and no drive power is transmitted to the associated ring gear connected pulleys. The drive condition is reestablished by rocking of rail 83 until the parts are again associated as in FIG. 1, with yoke 73 being disposed between the toggle links and effectively preventing their collapse toward neutral while the vehicle drive is being transmitted.

The invention provides a compact low cost mechanical transmission that performs competitively with more complex expensive hydrostatic drives, particularly in the low power field, while being more reliable and easier to service.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a mechanical transmission, an input shaft, two variable ratio pulley means driven by said input shaft, an output shaft, planetary gearing drive connecting both of said pulley means to the output shaft, and control means comprising a single movably mounted lever operatively connected to both of said pulley means for inversely varying the drive ratios of said pulley means, said pulley means comprising spaced variable diameter drive pulleys on said input shaft, each of said pulleys having an axially shiftable side member, and said control means comprising a motion transmitting connection between said lever and both of said side members, said motion transmitting connection comprising a pair of rotatable collars, one mounted on each pulley side member, and means including toggle mechanism connecting both said collars to said lever, said motion transmitting connection comprising a longitudinally slidable rail having a pivotal connection to said lever, an arm fixed to said rail, and said toggle mechanism comprising a pair of links pivoted to the respective collars and a member pivoted to both links and said arm.

2. In a mechanical transmission, an input shaft, an output shaft, two variable ratio pulley means driven by said input shaft to provide infinitely variable ratio drive between said shafts, planetary gearing operatively driven by said pulley means drive connecting both of said pulley means to the output shaft, and control means comprising a single movably mounted lever operatively connected to both of said pulley means for inversely varying the drive ratios of said pulley means, and means in said control means actuated by a movement of said lever for interrupting the drive of said planetary gearing by said variable ratio pulley means at any of said infinitely variable drive ratios of said pulley means.

3. In a mechanical transmission assembly having an input and an output, means providing infinitely variable forward and reverse drive between the input and output comprising planetary gearing having a rotatable ring gear, a rotatable carrier mounting a plurality of rotatable planet gears meshed with said ring gear and a rotatable sun gear meshed with said planet gears, means drive connecting said carrier to the output, variable ratio pulley means driven by the input and connected respectively to said ring gear and said sun gear, and control means for inversely varying the drive ratio of said pulley means, means in said control means for interrupting the drive of said sun gear and said ring gear through said variable ratio pulley means at any of said infinitely variable forward and reverse drive ratios.

4. In the mechanical transmission defined in claim 2, said pulley means comprising spaced variable diameter drive pulleys on said input shaft, each of said pulleys having an axially shiftable side member, and said control means comprising a motion transmitting connection between said lever and both of said side members.

5. In the mechanical transmission defined in claim 4, said motion transmitting connection comprising a pair of rotatable collars, one mounted on each pulley side member, and means including toggle mechanism connecting both said collars to said lever.

6. In the mechanism defined in claim 1, means mounting said rail for rocking about its longitudinal axis for displacing said member to collapse said toggle mechanism for disabling drive transmission by said pulley means.

7, In the mechanical transmission assembly defined in claim 3, said control means comprising a single movably mounted lever operatively connected to said pulley means.

* * * * *